United States Patent
Ou et al.

(10) Patent No.: US 10,401,256 B2
(45) Date of Patent: Sep. 3, 2019

(54) VERTICAL DISPLACEMENT DETECTING DEVICE

(71) Applicant: Guangxi Geotechnical New Technology CO.,LTD, Laibin (CN)

(72) Inventors: Xiaoduo Ou, Laibin (CN); Chuncai Lin, Laibin (CN); Kaiwen Hou, Laibin (CN); Jie Jiang, Laibin (CN); Wanjin Zhao, Laibin (CN); Fuchang Hou, Laibin (CN); Jianwen Chen, Laibin (CN)

(73) Assignee: Guangxi Geotechnical New Technology CO., LTD, Nanning (CN)

( * ) Notice: Subject to any disclaimer, the term of this patent is extended or adjusted under 35 U.S.C. 154(b) by 117 days.

(21) Appl. No.: 15/687,514

(22) Filed: Aug. 27, 2017

(65) Prior Publication Data

US 2018/0195930 A1    Jul. 12, 2018

(30) Foreign Application Priority Data

Jan. 10, 2017 (CN) .......................... 2017 1 0015652

(51) Int. Cl.
| | |
|---|---|
| *G01M 5/00* | (2006.01) |
| *G01B 5/06* | (2006.01) |
| *G01B 5/30* | (2006.01) |
| *E02D 33/00* | (2006.01) |
| *G01B 5/00* | (2006.01) |
| *G01B 3/22* | (2006.01) |
| *F16H 55/36* | (2006.01) |

(52) U.S. Cl.
CPC ........... *G01M 5/0058* (2013.01); *G01B 5/061* (2013.01); *G01B 5/063* (2013.01); *G01B 5/30* (2013.01); *E02D 33/00* (2013.01); *E02D 2600/10* (2013.01); *F16H 55/36* (2013.01); *G01B 3/22* (2013.01); *G01B 5/0004* (2013.01); *G01B 5/0009* (2013.01)

(58) Field of Classification Search
CPC ....... G01M 5/0058; G01B 5/061; G01B 5/30; G01B 5/063; G01B 5/0004; G01B 3/22; G01B 5/0009; E02D 2600/10; E02D 33/00; F16H 55/36; G01L 5/0033; G01N 3/08

See application file for complete search history.

(56) References Cited

U.S. PATENT DOCUMENTS

| | | | | |
|---|---|---|---|---|
| 4,097,996 A | * | 7/1978 | Yamazawa | G01B 5/008 33/1 M |
| 5,463,902 A | * | 11/1995 | Shrive | A61B 5/1108 33/790 |
| 5,693,890 A | * | 12/1997 | Holmes | G01N 3/04 73/826 |

* cited by examiner

*Primary Examiner* — Xin Y Zhong
(74) *Attorney, Agent, or Firm* — Wayne & Ken, LLC; Tony Hom

(57) ABSTRACT

The disclosure relates to a vertical displacement detecting device, comprising a fixed frame, a first guiding rail and a second guiding rail. The first guiding rail and the second guiding rail are respectively provided with a first sliding block and a second sliding block. The top or bottom surface of the blocking plate is contacted with a displacement detector. The second sliding block is provided with a traction wire. A top end of the fixed frame is provided with a pulley and a traction wire, and the traction wire is wound around the pulley, one end of the traction wire is connected with the first sliding block and the other end is connected to the second sliding block. The disclosure has the advantages of simple structure, accurate precision, low cost and simple realization method, and it is advantageous for wide use.

6 Claims, 3 Drawing Sheets

VERTICAL DISPLACEMENT DETECTING DEVICE

FIELD OF THE INVENTION

The present disclosure relates to the field of displacement detection, and more specifically, to a vertical displacement detecting device.

BACKGROUND OF THE INVENTION

In the field of production and engineering, the displacement of components and devices are usually measured to characterize the characteristics of components or devices by change of the displacement or to deduce the characteristics of components or devices by combining the displacement. For example, according to the requirements on the *Code for Acceptance of Construction Quality of Building Foundation* in China, static load detection of bearing capacity of foundation test pile and engineering pile should be performed to determine and test the bearing capacity of single pile, which is regarded as a mandatory article for the acceptance of pile quality requirements. Now the self-balancing method is commonly used in testing the bearing characteristics of the pile foundation. The self-balancing method is that: the load box and welded steel cage are imbedded in the corresponding position of the pile in advance, and then poured into the pile. When the strength of concrete meets certain requirements, the load box will simultaneously produce thrust upwards and downwards (namely vertical direction) by pressurizing and loading the load box in the pile by the pressurized pump on the ground platform, forcing the upper and lower bodies of the pile to be displaced. The displacement of the upper and lower bodies of the pile is measured by measuring the displacement of the upper and lower surfaces of the load box, and the bearing capacity characteristics of the foundation pile is judged according to the displacement. The bearing capacity of the single pile can be calculated by the loading value corresponding to the measured displacement. However, the domestic self-balancing method often uses the method of connecting the displacement rod on the upper and lower surfaces of the load box to measure the displacement of the pile, which in some cases is not accurate and its own cost is relatively expensive, so the method is not widely used.

In the prior art, the displacement detecting device is complicated and the method is relatively cumbersome. Like laser measurement, it is possible to achieve a more accurate measurement of the displacement, but the supporting facilities are expensive, and it is difficult to be used in multiple spot and large scale, and the application is restricted greatly. Therefore, a displacement detecting device with a simple structure and accurate measurement is demanded.

SUMMARY OF THE INVENTION

Aiming at the above deficiencies, the present disclosure provides a vertical displacement detecting device with a simple structure and accurate measurement.

In order to achieve the above objects, the present disclosure adopts the following technical scheme:

A vertical displacement detecting device comprises a fixed frame, a first guiding rail and a second guiding rail provided on both sides of the fixed frame respectively; the first guiding rail and the second guiding rail are provided with a first sliding block and a second sliding block respectively. The sliding block is provided with a pulling part, the second sliding block is provided with a blocking plate, the top or bottom surface of the blocking plate is contacted with a displacement detector, the displacement detector is used to measure the displacement of the blocking plate, and the second sliding block is provided with a displacement wire. The weight of the first sliding block and the pulling part is greater than the weight of the second sliding block and the blocking plate; the top end of the fixed frame is provided with a pulley and a traction wire used with the pulley, the traction wire is wound around the pulley, one end of the traction wire is connected to the first sliding block and the other end is connected to the second sliding block.

Preferably, the displacement detector is a dial gage or a displacement sensor because of its small structure, light weight and high precision.

Preferably, there are two pulleys, and the two pulleys are located above the first guiding rail and the second guiding rail respectively. The number of pulleys corresponds to the number of rails, and the pulleys are located above the first guiding rail and the second guiding rail respectively to ensure the sliding of the first sliding block and the second sliding block can slide.

Preferably, the bottom of the fixed frame is provided with a hoop. By means of the hoop, the vertical displacement detecting device can be matched and mounted on the rod-like benchmark structure.

Preferably, sliding slots are provided on the first guiding rail and the second guiding rail respectively, and the first sliding block and the second sliding block are respectively provided with anti-rotating bumps used with the sliding slots. The sliding slots and the anti-rotating bump matched with the sliding slots are arranged to prevent the first sliding block and the second sliding block from rotating against the first guiding rail and the second guiding rail, thereby avoiding movement of the second sliding block caused by the traction wire driven by rotation.

Preferably, the traction wire is a steel wire rope. The wire rope has a good toughness, and wire rope is not easy to be broken and can ensure that the traction wire is not deformed axially.

Preferably, the displacement wire is a steel wire or an iron wire. The steel wire or iron wire has a good toughness, is not easy to be broken and can ensure that the traction wire is not deformed axially.

Compared with the prior art, the disclosure has the following advantages effects: the second sliding block is pulled by the pulling part and the gravity of the first sliding block, one end of the displacement wire is connected with the second sliding block, and the other end is connected with the object to be detected, so the second sliding block and the blocking plate thereon are in a temporarily stationary state; when the displacement is measured, the object to be detected is displaced or deformed in the action of its own internal force or the external force, and the displacement wire connected with the the object to be detected is moved and drives the second sliding block and the blocking plate thereon to move; when the blocking plate is moved, the displacement detector can measure the vertical displacement of the blocking plate, and measure the vertical displacement of the object to be detected. The disclosure has the advantages of simple structure, accurate precision, low cost and simple realization method, and it is advantageous for wide use.

BRIEF DESCRIPTION OF THE DRAWINGS

In order to more clearly illustrate the technical solution of the embodiments of the present disclosure, the drawings to be used in the description of the embodiments will be briefly described below.

In the figures, 1-fixed frame, 2-first guiding rail, 3-second guiding rail, 4-first sliding block, 5-second sliding block, 6-pulling part, 7-blocking plate, 8-displacement wire, 9-pulley, 10-traction wire, 11-displacement detector, 12-hoop, 13-sliding slot, 14-anti-rotating bump, 15-supporting frame.

DETAILED DESCRIPTION OF THE INVENTION

In the following, the technical solutions in the embodiments of the disclosure will be described with reference to the accompanying drawings in the embodiments of the disclosure. Obviously, the described embodiments are merely part of the present disclosure, and not the whole. All other embodiments obtained by those of ordinary skill in the art without making creative work based on embodiments in the present disclosure are within the scope of the present disclosure.

Figure 1:
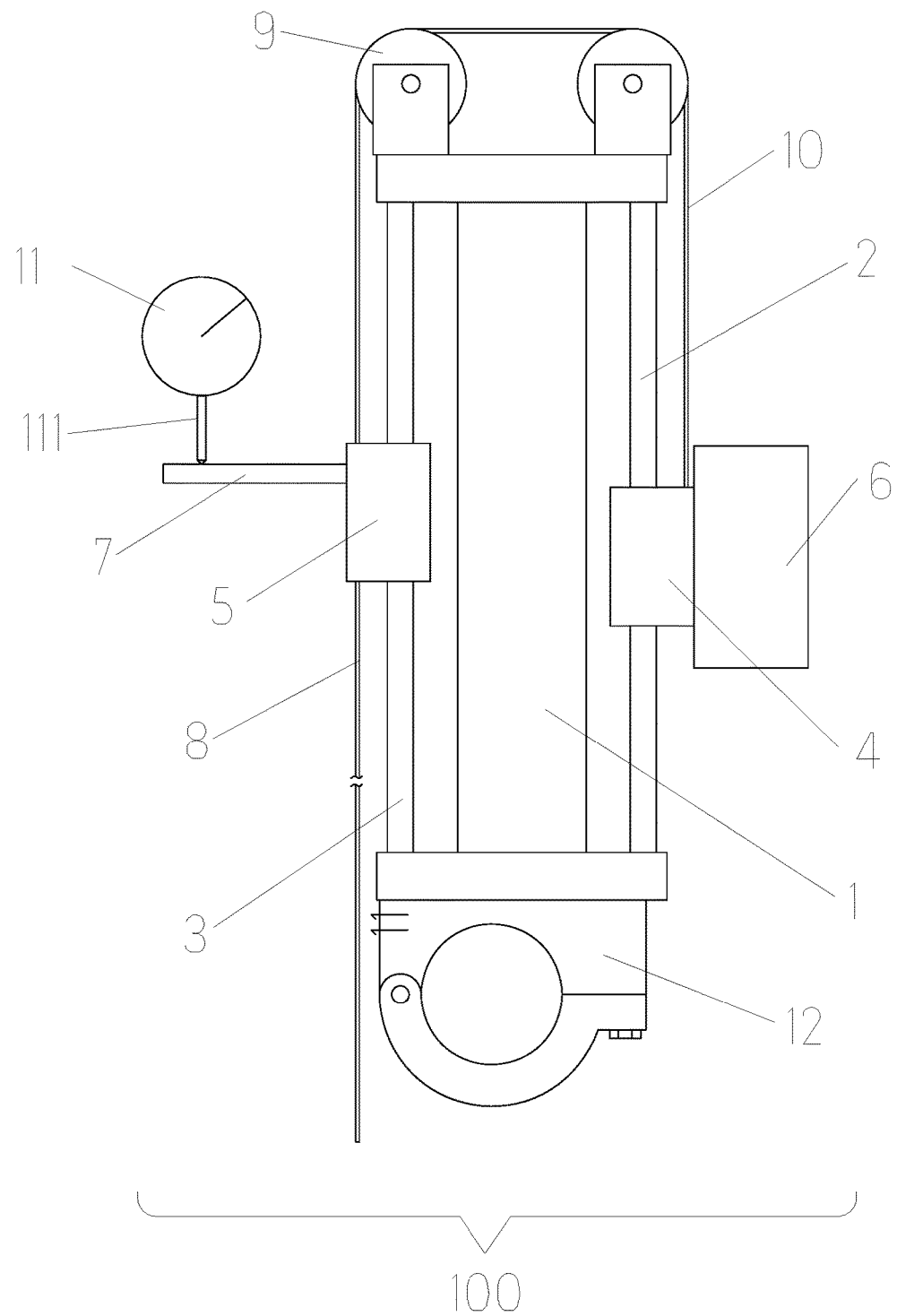
FIG. 1 is a schematic view of a vertical displacement detecting device.
Figure 2:
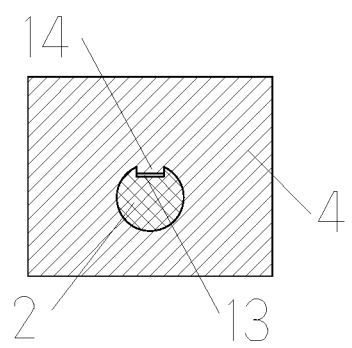
FIG. 2 is a cross-sectional view of a first guiding rail and a first sliding block.
Figure 3:
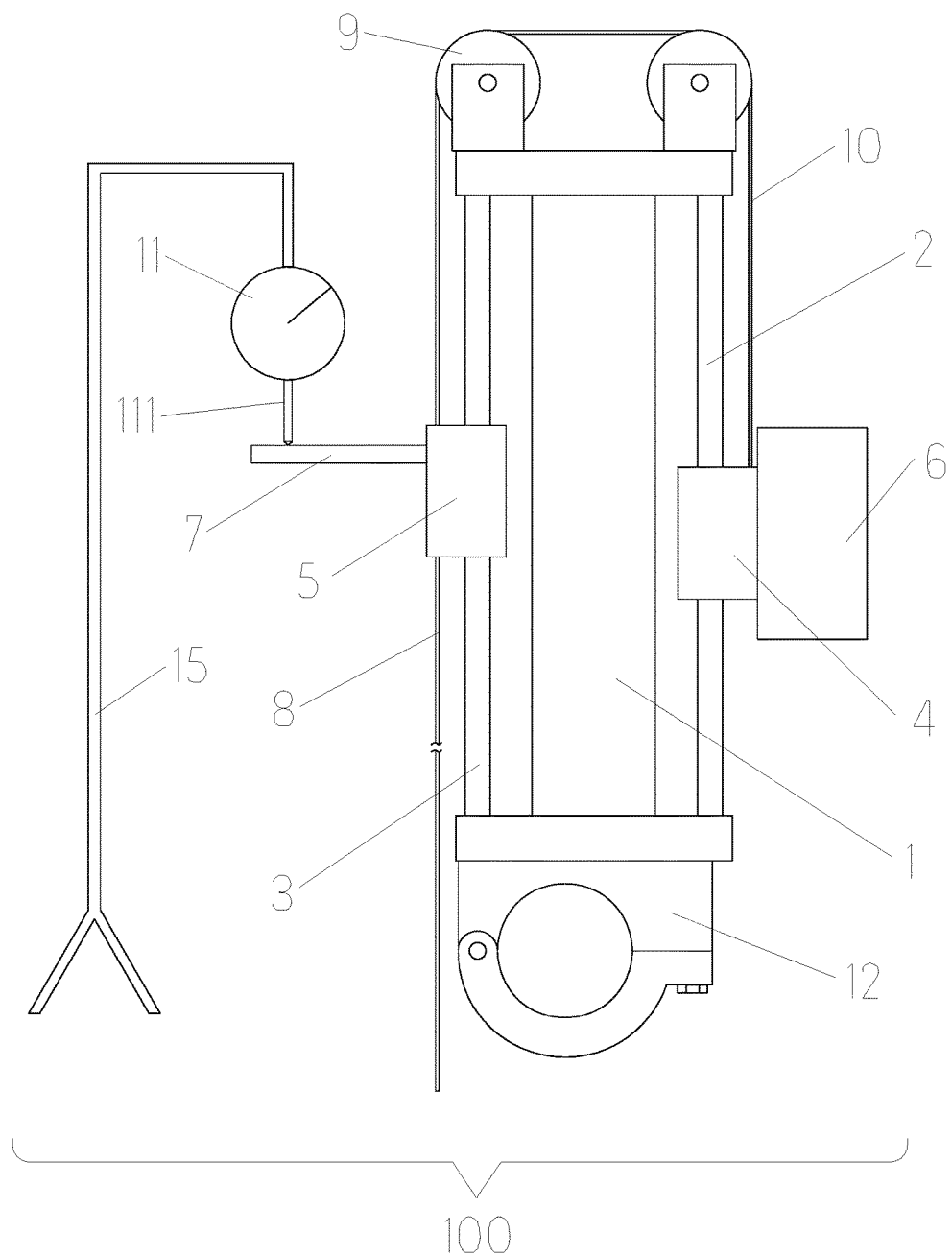
FIG. 3 is an installation diagram of a vertical displacement detecting device.

Referring to FIGS. 1, 2 and 3, the present disclosure provides a vertical displacement detecting device. A vertical displacement detecting device 100 comprises a fixed frame 1 and a first guiding rail 2 and a second guiding rail 3 provided on both sides of the fixed frame 1 respectively, the first guiding rail 2 and the second guiding rail 3 are provided with a first sliding block 4 and a second sliding block 5 respectively, the first sliding block 4 is provided with a pulling part 6, and the second sliding block 5 is provided with a blocking plate 7, and the top or bottom of the blocking plate 7 is contacted with the displacement detector 11 fixed by a fixed frame 15, the displacement detector 11 is a dial gage, the bottom of the displacement detector 11 is provided with an elastic telescopic ejector pin 111 which is contacted with the blocking plate 7, and when the blocking plate 7 moves up and down, the ejector pin 111 shrinks and stretches so as to pass the displacement to the dial gage 11 to show up and down displacement distance. The second sliding block 5 is provided with a displacement wire 8, the displacement wire 8 is a steel rope, one end of the displacement wire 8 is connected with the second sliding block 5 and the other end of the displacement wire 8 is connected with the reserved measuring position on the object to be detected. The weight of the first sliding block 4 and the pulling part 6 is greater than the weight of the second sliding block 5 and the blocking plate 7 and smaller than the weight of the object to be detected. The top end of the fixed frame 1 is provided with two pulleys 9 and a traction wire 10 used with the pulleys 9. The two pulleys 9 are provided above the first guiding rail 2 and the second guiding rail 3 respectively. The traction wire 10 is a steel wire rope, and the traction wire 10 is wound around the two pulleys 9, and one end of the traction wire 10 is connected with the first sliding block 4 and the other end of the traction wire 10 is connected with the second sliding block 5. The first guiding rail 2 and the second guiding rail 3 are provided with sliding slots 13. The first sliding block 4 and the second sliding block 5 are provided with anti-rotating bumps 14 matched with the sliding slots 13. The anti-rotating bumps 14 are integrated with the first sliding block 4 and the second sliding block 5. The anti-rotating bumps 14 matched with the sliding slots 13 prevents the first sliding block 4 and the second sliding block 5 from rotating against the first guiding rail 2 and the second guiding rail 3 so as to avoid movement of the second sliding block 5 caused by the traction wire 10 driven by rotation.

FIG. 2 is a cross-sectional view of the first guiding rail 2 and the first sliding block 4. The cross-sectional view of the second guiding rail 3 and the second sliding block 5 is not provided, however, the location, structure and shape of the sliding slots 13 on the second guiding rail 3 and the second sliding block 5, and the anti-rotating bumps 14 matched with the sliding slots 13 are the same with the sliding slots 13 on the first guiding rail 2 and the first sliding block 4. and the anti-rotating bumps 14.

Referring to FIG. 3, the fixed frame 1 and the first guiding rail 2 may be integrally formed, or be fixed by means of welding, plug or thread connection, so do the second guiding rail 3 and the pulleys 9, the first sliding block 4 and the pulling part 6 as well as the second sliding block 5 and the blocking plate 7. In this embodiment, the hoop 12 is fixed on the bottom end of the fixed frame 1. Of course, the hoop 12 can also be connected with the fixed frame 1 by means of plug or thread connection.

The supporting frame 15 is an external structure and is not a member of the present disclosure. The displacement detector 11 is fixed by the supporting frame 15, and the supporting frame 15 is not in contact with the other components in the vertical displacement detecting device disclosed in the present disclosure except the blocking plate 7 to avoid the mutual interference of the displacement detector 11 and other components. The fixed frame 1 is mounted and fixed to an external structure (such as a fixed platform or a rod-like support frame) (not shown in FIG. 3). The fixed frame 1 can be mounted directly on the external structure or is mounted and fixed to the rod support frame by setting the hoop 12 at the bottom.

In the test, multiple positions of the object to be detected are usually tested. When it is necessary to test a plurality of positions of the object to be detected, a plurality of vertical displacement detecting devices 100 are used. It is worth noting that the contact position of the displacement detector 11 with the blocking plate 7 is not fixed, the displacement detector 11 may be in contact with the top or bottom surface of the blocking plate 7 and it is not affected by the displacement of the blocking plate 7, but the displacement detector 11 needs to be zero.

The working principle of the disclosure is that: the fixed frame 1 is mounted and fixed on the external structure and the first guiding rail 2 and the second guiding rail 3 are perpendicular to the ground to the greatest extent to reduce friction caused by the movement of the first sliding block 4 and the second sliding block 5 and further reduce measuring error caused by friction. The pulley 9 is provided with a traction wire 10, and both ends of the traction wire 10 are connected with the first sliding block 4 and the second sliding block 5 respectively. Because the weight of the first sliding block 4 and the pulling part 6 is greater than the weight of the second sliding block 5 and the blocking plate 7, the first sliding block 4 and the pulling part 6 will pull the second sliding block 5 up, but the second slider 5 is connected to the object to be detected by the displacement wire 8 and smaller than the weight of the object to be detected. The object to be detected is connected to the displacement wire 8 and pulls the second sliding block 5 down, so that the second sliding block 5 is in a stationary state. When the object is tested, the object to be detected occurs a vertical displacement under the action of internal force or external force, the displacement wire 8 is displaced, and the second slider 5 is displaced vertically, and the blocking plate 7 on the second sliding block 5 is displaced vertically, and the displacement of the blocking plate 11 is measure by the displacement detector 11 (in this embodiment, the displacement detector 11 is a dial gage) located above or below the blocking plate 7, and the vertical displacement of the object to be tested is further tested.

The method of realization of the disclosure is further explained by self-balancing method used to detect the bearing capacity of a single pile, which is as follows: the fixed frame 1 is fixed to an external structure other than the base pile (such as a fixed platform or a rod-like supporting frame) and the first guiding rail 2 and the second guiding rail 3 are perpendicular to the ground to the greatest extent to reduce the error caused by friction. The pulley 9 is matched with the traction wire 10, and both ends of the traction wire 10 are connected with the sliding block 4 and the second sliding block 5. Because the weight of the sliding block 4 and the pulling part 6 is greater than the weight of the second sliding block 5 and the blocking plate 7, the sliding block 4 and the pulling part 6 pull the second sliding block 5 and the blocking plate 7 up. But the second sliding block 5 is connected with the top or bottom of the load box by the displacement wire 8, so the displacement wire 8 pulls the second sliding block 5 down, and the second sliding block 5 is in a temporary stationary state. When the load box is loaded and tested, the load box will be displaced (deformed) due to the force, the top of the load box will move up and the bottom of the load box will move down, thus driving the displacement wire 8 to move up (the displacement wire 8 will move down when connected with the bottom of the load box), and the second sliding block 5 and the blocking plate 7 located thereon also move up (the displacement wire 8 will move down when connected with the bottom of the load box), the vertical displacement of the blocking plate 7 is measured by a dial gage on the upper surface of the blocking plate 7, thus the vertical displacement of the blocking plate 7 is obtained, the vertical displacement of the load box is further obtained. When the performance parameters of the load box are needed to be further obtained, the displacement of the blocking plate 7 can be combined with other parameters (conventionally, parameters required to test the bearing capacity of a single pile through the load box is the prior art) to complete the test of bearing capacity of a single pile. In the test of the load box, multiple positions of the load box may need to be tested. When multiple positions of the load box need to be tested, multiple vertical displacement detecting devices used independently and simultaneously used are enough.

Above disclosure are merely some specific embodiments of the present disclosure, but the protective scope of the present disclosure is not limited thereto, and any variations or substitutions made by those skilled person in the art within the technical scope of the present disclosure should be covered within the scope of the present disclosure. Accordingly, the protective scope of the present disclosure should be based on the protective scope of the claims.

What is claimed is:

1. A vertical displacement detecting device, comprising a displacement detector (11) supported by an external supporting frame (15), a fixed frame (1), a first guiding rail (2) and a second guiding rail (3) provided on both sides of the fixed frame (1) respectively; the first guiding rail (2) and the second guiding rail (3) are provided with a first sliding block (4) and a second sliding block (5) respectively;

wherein the first sliding block (4) is provided with a pulling part (6), the second sliding block (5) is provided with a blocking plate (7), the top or bottom surface of the blocking plate (7) is contacted with a displacement detector (11), the displacement detector (11) is used to measure a displacement of the blocking plate (7); the second sliding block (5) is provided with a displacement wire (8), and the weight of the first sliding block (4) and the pulling part (6) is greater than the weight of the second sliding block (5) and the blocking plate (7); the top end of the fixed frame (1) is provided with pulleys (9) and a traction wire (10) used with the pulley (9), the traction wire (10) is wound around the pulleys (9), one end of the traction wire (10) is connected to the first sliding block (4) and the other end is connected to the second sliding block (5);

sliding slots (13) are provided on the first guiding rail (2) and the second guiding rail (3) respectively, and the first sliding block (4) and the second sliding block (5) are respectively provided with anti-rotating bumps (14) used with the sliding slots (13).

2. The vertical displacement detecting device of claim 1, wherein the displacement detector (11) is a dial gage or a displacement sensor.

3. The vertical displacement detecting device of claim 1, wherein there are two pulleys (9), and the two pulleys (9) are located above the first guiding rail (2) and the second guiding rail (3) respectively.

4. The vertical displacement detecting device of claim 1, wherein the bottom of the fixed frame (1) is provided with a hoop (12).

5. The vertical displacement detecting device of claim 1, wherein the traction wire (10) is a steel wire rope.

6. The vertical displacement detecting device of claim 1, wherein the displacement wire (8) is a steel wire or an iron wire.

* * * * *